United States Patent [19]

Welte et al.

[11] 4,190,459

[45] Feb. 26, 1980

[54] PROCESS FOR THE PRODUCTION OF MINERAL FIBER MATS

[75] Inventors: Rainer Welte, Leverkusen, Fed. Rep. of Germany; Peter Markusch, New Martinsville, W. Va.; Dieter Dieterich, Leverkusen; Werner Dietrich, Cologne, both of Fed. Rep. of Germany

[73] Assignee: Bayer Aktiengesellschaft, Leverkusen, Fed. Rep. of Germany

[21] Appl. No.: 917,766

[22] Filed: Jun. 21, 1978

[30] Foreign Application Priority Data

Jun. 22, 1977 [DE] Fed. Rep. of Germany ....... 2728074

[51] Int. Cl.$^2$ ...................... C04B 31/08; C04B 31/42; C09K 3/00
[52] U.S. Cl. .......................... 106/287.25; 106/287.34
[58] Field of Search ............... 162/181 C; 106/287.34, 106/74, 38.35, 287.25

[56] References Cited

U.S. PATENT DOCUMENTS 3,778,283  12/1973  von Freyhold ................. 106/287.34

FOREIGN PATENT DOCUMENTS 1770384  10/1971  Fed. Rep. of Germany .
1362003   4/1964  France .
1429552   1/1966  France .

OTHER PUBLICATIONS

Chem. Abst. 65:17,166f.

*Primary Examiner*—Theodore Morris
*Attorney, Agent, or Firm*—Gene Harsh; Joseph C. Gil

[57] ABSTRACT

This disclosure teaches a method of forming mineral mates by using an emulsion of water glass and isocyanates as the binder. This binder composition may be readily dispersed with air and has superior adhesion to mineral fibers.

6 Claims, No Drawings

PROCESS FOR THE PRODUCTION OF MINERAL FIBER MATS

BACKGROUND OF THE INVENTION

It is known that, to produce glass fiber insulating materials, glass or mineral wool felts may be sprayed with aqueous adhesives based on phenol-formaldehyde resins or urea-formaldehyde resins for the purposes of consolidation. Adhesives having very high water contents have to be used because the adhesive is applied to the still highly heated glass or mineral mass and thermal decomposition phenomena and observed with low water contents. The water applied is evaporated during subsequent hardening of the adhesives and is let off as waste air.

It is not possible to prevent parts of the adhesive components from being lost together with the waste air. This is an economic disadvantage because this part of the adhesive is lost during formation of the bond. Above all, however, this process is attended by significant disadvantages when physiologically harmful, readily volatile components are given off with the waste air, as in the case of formaldehyde-containing adhesives, for example.

Accordingly, it is extremely desirable both for economic and for ecological reasons to reduce the proportion of readily volatile adhesive components in the waste air without at the same time losing the desirable properties of the adhesives.

This problem is solved by the present invention.

SUMMARY OF THE INVENTION

Surprisingly, it has been found that emulsions of isocyanates and water glass represent extremely effective binders for the consolidation of mineral fibers for the production of mineral fiber mats which contain no volatile constituents apart from water.

Accordingly, the present invention relates to a process for the production of mineral fiber mats by bonding mineral fibers with binders, wherein an emulsion of water glass and isocyanate which has been prepared in a preceding mixing unit is used as binder.

DETAILED DESCRIPTION OF THE INVENTION

The combination of water glass and isocyanate as an adhesive is known, for example from French Patent Nos. 1,429,552 and 1,362,003 and from German Published Patent Specification No. 1,770,384. However, this simultaneous use of isocyanates with water glass is of no commercial value because although the products may be used alongside one another for bonding purposes, the quality of the bonds obtained is no better than in cases where the two components are used on their own.

By contrast, it has surprisingly been found that, by mechanically mixing the two components in standard mixing units, it is possible to obtain stable emulsions of isocyanate/water glass which are eminently suitable for bonding mineral fibers for the production of mineral fiber mats. Although these emulsions are highly viscous, they may still be satisfactorily pumped. Despite the relatively high viscosity thereof, these emulsions may still be dispersed extremely well with air. The degree of dispersion obtained may be considerably better than that obtained in cases where extremely low viscosity adhesive compositions are used.

It has been found that the emulsions used in accordance with the present invention show particularly good adhesion precisely to the surfaces of the mineral fibers.

The water glass used in accordance with the present invention may be any standard commercial-grade water glass, soda water glass and potash water glass being preferred, although it is also possible to use other alkali metal and/or ammonium silicate solutions or mixtures of these substances. It does not matter whether the silicate solutions are present in the form of true aqueous solutions or completely or partly in the form of colloidal solutions.

It is also possible without any disadvantages to use crude technical silicate solutions which contain additional impurities, such as calcium silicates, magnesium silicates, borates or aluminates.

It is preferred to use standard commercial-grade water glasses which have an alkali oxide to silicon dioxide ratio of between about 1:1.8 and 1:4.1 and total solids contents of, in general, from about 28 to 55%.

The concentration of the water glasses used may readily be varied in accordance with the viscosity requirements or in accordance with the necessary water content, although it is preferred to use water glasses having a solids content of from about 40 to 55%, by weight, or water glasses having a viscosity of at least about 100 cP at 25° C.

It is particularly preferred to use water glasses having a solids content of from about 44 to 45%, by weight, or water glasses having a viscosity of at least about 400 cP/25' C.

The nature of the isocyanates used for preparing the dispersions is not critical, although they should best have such a high boiling point that they do not evaporate to any significant extent at 100° C. This prevents significant quantities of the adhesive from volatilizing with the waste air during application or hardening of the adhesive, as may be the case with conventional adhesives.

Suitable isocyanates are monisocyanates, such as n-octyl isocyanate, cyclohexyl isocyanate and phenyl isocyanate, polyisocyanates, such as aliphatic, cycloaliphatic, araliphatic, aromatic and heterocyclic polyisocyanates of the type described, for example, by W. Siefken in *Justus Liebigs Annalen der Chemie*, 562, pages 75 to 136, and in *Polyurethanes: Chemistry and Technology*, Volume I Chemistry by Saunders and Frisch 1963 especially pages 17 to 48, for example 1,6-hexamethylene diisocyanate, 1,12-dodecane diisocyanate, cyclobutane-1,3-diisocyanate, cyclohexane-1,3- and 1,4-diisocyanate, also mixtures of these isomers, 1-isocyanato-3,3,5-trimethyl-5-isocyanatomethyl cyclohexane (DAS No. 1,202,785, U.S. Pat. No. 3,401,190 incorporated herein by reference), 2,4- and 2,6-hexahydro-tolylene diisocyanate, also mixtures of these isomers, hexahydro-1,3- and/or 1,4-phenylene diisocyanate, perhydro-2,4'- and/or -4,4'-diphenyl methane diisocyanate, 2,4- and 2,6-tolylene diisocyanate, also mixtures of these isomers, diphenyl methane-2,4' and/or -4,4'-diisocyanate, naphthylene-1,5-diisocyanate, triphenyl methane- 4,4', 4"-triisocyanate, polyphenyl polymethylene polyisocyanates, of the type which may be obtained by condensing aniline with formaldehyde, followed by phosgenation, and which are described, for example, in British Patent Nos. 874,430 and 848,671, m- and p-isocyanatophenyl sulphonyl isocyanates according to U.S. Pat. No. 3,454,606 incorporated herein by reference, perchlorinated aryl polyisocyanates of the type described, for example, in German Auslegeschrift No. 1,157,601 (U.S. Pat. No. 3,277,138 incorporated herein by reference), polyisocyanates containing carbodiimide groups of the type described in German Patent No. 1,092,007 (U.S. Pat. No. 3,152,162 incorporated herein by reference, diisocyanates of the type described in U.S. Pat. No. 3,492,162 incorporated herein by reference polyisocyanates containing allophanate groups of the type described, for example in British Patent No. 994,890, Belgian Patent No. 761,626 and published Dutch Patent Applicaton No. 7,102,524, polyisocyanates containing isocyanurate groups of the type described, for example, in U.S. Pat. No. 3,001,973 incorporated herein by reference, German Patent Nos. 1,022,789; 1,222,067 and 1,027,394 and in German Offenlegungsschrift Nos. 1,929,034 and 2,004,048, polyisocyanates containing urethane groups of the type described, for example, in Belgian Patent No. 752,261 or in U.S. Pat. No. 3,394,164 incorporated herein by reference, polyisocyanates containing acylated urea groups according to German Patent No. 1,230,778, polyisocyanates containing biuret groups of the type described, for example, in German Patent No. 1,101,394 (U.S. Pat. Nos. 3,124,605 and 3,201,372 incorporated herein by reference) and in British Patent No. 889,050, polyisocyanates obtained by telomerization reactions of the type described, for example, in U.S. Pat. No. 3,654,106 incorporated herein by reference, polyisocyanates containing ester groups of the type described, for example, in British Patent Nos. 965,474 and 1,072,956, in U.S. Pat. No. 3,567,763 incorporated herein by reference, and in German Patent No. 1,231,688, reaction products of the above-mentioned isocyanates with acetals according to German Patent No. 1,072,385 and polyisocyanates containing polymeric fatty acid radicals according to U.S. Pat. No. 3,455,883 incorporated herein by reference.

It is also possible to use the isocyanate group-containing distillation residues obtained in the production of isocyanates on a commercial scale, optionally in solution in one or more of the aforementioned polyisocyanates. It is also possible to use mixtures of the aforementioned polyisocyanates.

In general, it is particularly preferred to use the commercially readily available polyisocyanates, for example 2,4- and 2,6- tolylene diisocyanate, also mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"). Crude MDI is most preferred.

Suitable mineral fibers are any known mineral fibers, such as glass, asbestos and mineral fibers, preferably glass fibers.

According to the present invention, it is also possible to add additives to one of the two components of the emulsion. These additives may be present in the form of a solution in one of the two components or even in the form of an emulsion or dispersion in one of the two components.

The nature and purpose of the additives are determined by the particular embodiment of the process according to the present invention. Thus, it is possible to use any conventional emulsification aids in order further to stabilize the emulsion formed. Very small quantities of from about 0.01 to 1.00%, by weight, based on the emulsion, will be sufficient because the emulsions produced are extremely stable even without an auxiliary emulsifier.

According to the present invention, catalysts are also frequently used. Examples of suitable known catalysts are, for example, tertiary amines, such as triethyl amine, tributyl amine, N-methyl morpholine, N-ethyl morpholine, N-cocomorpholine, N,N,N'N'-tetramethyl ethylene diamine, 1,4-diazabicyclo-(2,2,2)-octane, N-methyl-N'-dimethyl aminoethyl piperazine, N,N-dimethyl benzyl amine bis-(N,N-diethyl amino ethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-B-phenyl ethyl amine, 1,2-dimethyl imidazole and 2-methyl imidazole. Other suitable catalysts are known Mannich bases of secondary amines, such as dimethyl amine, and aldehydes, preferably formaldehyde, or ketones, such as acetone, methyl ethyl ketone or cyclohexanone, and phenols, such as phenol, nonyl phenol or bis-phenol.

Examples of tertiary amines containing isocyanate-reactive hydrogen atoms which may be used as catalysts are triethanolamine, triisopropanolamine, N-methyl diethanolamine, N-ethyl diethanolamine and N,N-dimethyl ethanolamine, also the reaction products thereof with alkylene oxides, such as propylene oxide and/or ethylene oxide.

Other suitable catalysts are silaamines having carbon-silicon bonds of the type described, for example, in German Patent No. 1,229,290 (corresponding to U.S. Pat. No. 3,620,984 incorporated herein by reference) for example 2,2,4-trimethyl-2-silamorpholine and 1,3-diethyl aminomethyl tetramethyl disiloxane.

Other suitable catalysts are nitrogen-containing bases, such as tetraalkyl ammonium hydroxides, also alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organometallic compounds, especially organotin compounds, may also be used as catalysts.

Preferred organotin compounds are tin (II) salts of carboxylic acids, such as tin (II) acetate, tin (II) octoate, tin (II) ethyl hexoate and tin (II) laurate, and the tin (IV) compounds, for example dibutyl tin oxide, dibutyl tin dichloride, dibutyl tin diacetate, dibutyl tin dilaurate, dibutyl tin maleate or dioctyl tin diacetate. It is, of course, possible to use the above-mentioned catalysts in the form of mixtures.

Further representatives of catalysts suitable for use in accordance with the present invention and details on the way in which the catalysts work may be found in *Kunststoff-Handbuch*, Vol. VII, by Vieweg and Hochtlen, Carl-Hanser-Verlag, Munich, 1966, for example on pages 96 to 102 and *Polyurethanes: Chemistry and Technology*, Vol. I Chemistry by Saunders and Frisch, 1963, especially pages 208 to 214.

The catalysts are generally used in quantities of from about 0.001 to 10%, by weight, based on the emulsion.

According to the present invention, surface-active additives, such as emulsifiers, may also be used. Examples of emulsifiers are the sodium salts of castor oil sulphonates or salts of fatty acids with amines, such as diethyl amine/oleic acid or diethanolamine/stearic acid. Alkali metal or ammonium salts of sulphonic acid, such as those of dodecyl benzene sulphonic acid dinaphthyl methane disulphonic acid, or of fatty acids, such as ricinoleic acid, or of polymeric fatty acids, may also be used as surface-active additives.

According to the present invention, it is also possible to use reaction retarders, for example substances which are acid in reaction, such as hydrochloric acid or organic acid halides.

Other examples of the additives optionally used in accordance with the present invention and also details on the way in which these additives are to be used and how they work, may be found in *Kunststoff-Handbuch,* Vol. VII, published by Vieweg and Hochtlen, Carl-Hanser-Verlag, Munich, 1966, for example on pages 103 to 113.

Additives which harden the water glass and additives which increase the tackiness of the emulsions formed, such as latices, fillers for extending or for binding the shrinkage level and, optionally, blowing or expanding agents, may also be incorporated into the emulsion.

EXAMPLE 1

100 parts, by weight, of water glass having a solids content of 45% (molar ratio of $Na_2O:SiO_2=1:2$) were intensively mixed for fifteen seconds with 100 parts, by weight, of polyphenyl polymethylene polyisocyanate (NCO content 31 % by weight) by means of a stirrer rotating at 2000 rpm. A light brown emulsion having a viscosity of approximately 40,000 cP is obtained, remaining processible for more than thirty minutes. Thereafter, its viscosity rises slowly to beyond 100 P/25° C.

EXAMPLE 2

100 parts, by weight, of water glass according to Example 1, pumped by means of a high pressure piston pump at 90 bars, are mixed with 25 parts, by weight, of polyisocyanate according to Example 1, which is also pumped by means of a high-pressure piston pump at 120 bars, by means of a toothed stirrer rotating at 2000 rpm. The following viscosities are measured as a function of time (at 25° C.):
Immediately—10 poises
1'—15 poises
2'—17 poises
4'—20 poises
8'—25 poises
60' approximately—100 poises

EXAMPLE 3

100 parts, by weight, of water glass having a solids content of 41% (molar ration of $Na_2O:SiO_2 1:3.1$) are mixed with 50 parts, by weight, of polyisocyanate according to Example 1 by means of a toothed stirrer rotating at 1500 rpm, the two components being delivered by means of two low pressure gear pumps. A light brown emulsion is obtained.

EXAMPLE 4

A dispersion according to Example 2 is delivered to a standard spraying nozzle where it is atomized into fine particles by means of compressed air. The spraying nozzle is arranged at a distance of approximately 10 cm in front of the spinning wheels of a standard mineral-fiber spinning machine. The delivery pipe to the nozzle is cooled by an external air jacket through which the air required for spraying is delivered.

The mineral fiber is dried within 2-4 minutes in a stream of hot air (temperature about 200° C.) and pressed to form a mat. Thus, flat, odorless mats having good cohesion are obtained. In all the tests to which they are subjected in accordance with DIN 18 165, sheet 1 or sheet 2, the thus-obtained mats correspond to or exceed the values which are reached with the same quantity of phenol-formaldehyde resin as binder (based on the same quantities of organic material).

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of mineral fiber mats by bonding mineral fibers with binders, wherein an emulsion of water glass and isocyanate which has been prepared in a preceding mixer is used as binder.

2. A process as claimed in claim 1, wherein an emulsion having an isocyanate to water glass ratio of between about 1:1 and 1:20, by weight, is used.

3. A process as claimed in claims 1 or 2, wherein an emulsion having an isocyanate to water glass ratio of between about 1:1.5 and 1:5, by weight, is used.

4. A process as claimed in claims 1 or 2, wherein water glass having an $SiO_2$ to $Na_2O$ molar ratio of between about 3:1 and 1.8:1 is used.

5. A process as claimed in claims 1 or 2, wherein water glass having a solids content of from about 40 to 55%, by weight, is used.

6. A process for forming mineral fiber mats comprising bonding the mineral fibers with a binder which is prepared by forming an emulsion of isocyanate and water glass.

* * * * *